United States Patent [19]
LaBelle

[11] Patent Number: 6,089,194
[45] Date of Patent: Jul. 18, 2000

[54] REVERSIBLE HEAT-REFLECTIVE PET GARMENT

[76] Inventor: Judy LaBelle, 22 Speice Rd., Pottstown, Pa. 19465

[21] Appl. No.: 09/086,353

[22] Filed: May 29, 1998

[51] Int. Cl.[7] .......................... A01K 29/00; A62B 17/00; B68C 5/00
[52] U.S. Cl. ........................... 119/850; 54/79.2; 54/79.4; 2/458
[58] Field of Search .............................. 119/850; 54/79.1, 54/79.2, 79.3, 79.4; 2/458, 2.17, 7, 908

[56] References Cited

U.S. PATENT DOCUMENTS

| | | | |
|---|---|---|---|
| D. 313,291 | 12/1990 | Shanley | D30/145 |
| D. 313,676 | 1/1991 | Indursky et al. | D30/145 |
| D. 372,563 | 8/1996 | Waugh, Jr. | D30/145 |
| D. 379,687 | 6/1997 | Curtis | D30/145 |
| D. 383,255 | 9/1997 | Caditz | D30/145 |
| 683,570 | 10/1901 | McWilliam | 54/27 |
| 2,850,860 | 9/1958 | Torell et al. | D30/145 |
| 3,591,400 | 7/1971 | Palmquist et al. | |
| 4,583,247 | 4/1986 | Fingerhut et al. | 2/69 |
| 4,685,155 | 8/1987 | Fingerhut et al. | 2/272 |
| 5,060,458 | 10/1991 | Curtis | 54/79.2 |
| 5,327,585 | 7/1994 | Karlan | 2/7 |
| 5,421,326 | 6/1995 | Rankin et al. | 128/201.19 |

*Primary Examiner*—Peter M. Poon
*Assistant Examiner*—Yvonne R. Abbott
*Attorney, Agent, or Firm*—Gregory J. Gore

[57] ABSTRACT

A protective coat for domestic animals, such as dogs, is reversible to alternatively protect against heat or cold. The coat is made of a light-weight flexible material that is preferably fastened with the use of hook-and-loop fastening strips. The coat is a two-ply garment, one ply providing a water-repellent surface, while the second ply provides a heat radiation-reflective surface. The preferred material used in constructing the pet garment is Astrolon®. The coat is a lamination of two sheets providing the desired protective qualities. The first sheet is aluminized clear polyethylene, and the second sheet is a colored polyethylene. The two sheets are heat-fused together. A cloth piping is sewn around the side edges of the lamination.

9 Claims, 2 Drawing Sheets

REVERSIBLE HEAT-REFLECTIVE PET GARMENT

FIELD OF THE INVENTION

The present invention relates to protective coats for animals and, in particular, for domestic pets.

BACKGROUND OF THE INVENTION AND DESCRIPTION OF PRIOR ART

Protective garments for domestic pets, such as dogs, are well-known and are made from many different patterns and utilize various different fastening means. Material used in prior art pet garments varies widely and both water repellent and thermally insulated materials have been employed. Furthermore, hook-and-loop type fasteners are well-known in this field.

The closest prior art patent of which the applicant is aware includes U.S. Pat. No. 3,918,238 which discloses a rain jacket for dogs. This document discloses the use of a jacket and hood for a dog which is composed of a waterproof material and secured by tie straps. U.S. Pat. No. 4,577,591, entitled "Incontinence and Protective Device for Animals", shows the use of hook and loop attachments for a dog garment. U.S. Pat. No. 5,060,458, entitled "Protective Dog Coat", shows the use of a two-ply protective coat which is attached by hook and loop fastening means.

None of these prior art references, however, teach or disclose the use of heat radiation reflecting material in combination with waterproofing material for a protective garment for a pet. Protection from the sun and excessive heat caused thereby is a significant concern for domestic pets. There is therefore a need in the art for a garment that will address this need. So far, protective garments have been designed to keep the animal warm, rather than keep it cool.

SUMMARY OF THE INVENTION

The present invention provides a protective reversible coat for domestic animals of different sizes and shapes. While the invention described herein is specifically directed to a dog, it may be readily reconfigured for use with many different animals. The coat of the present invention is made of a lightweight, flexible material that can either hold in or keep out body heat and rain. The coat is preferably fastened by the use of ties, buckles, snaps or pins; but, preferably, the use of hook-and-loop fastening strips.

The coat is a two-ply garment; one ply providing a water repellent surface, while the second ply provides heat radiation reflection. With the particular arrangement of fastening means further described herein, the coat of the present invention is reversible so that the different characteristics of each ply may be selectively employed. With the water-protective side facing outward, the heat reflective side faces inward and in this orientation, the coat functions to keep the pet warm and to repel rain water. With the coat reversed and the reflective side facing outward, heat from the sun is reflected and the pet is kept cool. The present coat may be used with an additional covering to provide yet greater warmth. In addition, greater visibility is provided by a brightly colored rain repellent material.

Therefore, the present invention fulfills the need in the art for a protective pet garment which is lightweight, highly flexible, provides dual purpose, and may be used to keep a pet cool when in direct sunlight.

Other objects, advantages and novel features of the present invention will become apparent from the following detailed description of the invention when considered in conjunction with the accompanying drawings.

BRIEF DESCRIPTION OF THE ILLUSTRATIONS

DESCRIPTION OF THE PREFERRED EMBODIMENT

Figure 1:
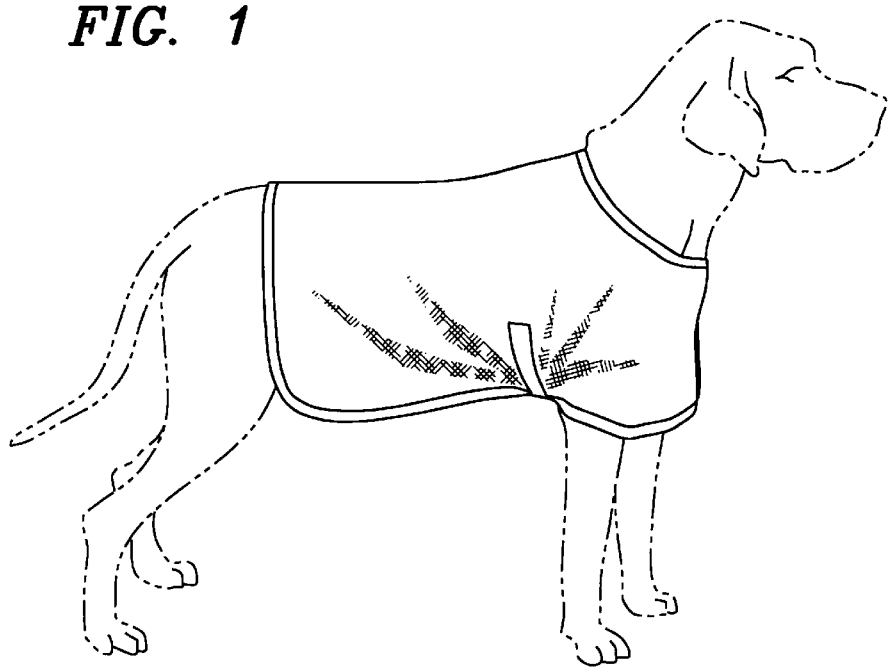
FIG. 1 shows an isometric view of the present pet garment worn by a dog.

FIG. 1 shows the present pet garment worn by a domestic pet, such as a dog. As shown in this illustration, the garment covers the back, side and chest of the animal. These are the surfaces most exposed to direct radiation from the sun. The outward-facing reflective surface 7 of the garment covers these areas and protects the animal from overheating. The garment is affixed by attachment means below the animal's neck and a belly strap which connects edges of two side portions of the garment passing underneath the mid-section of the animal to the other side. As will be further explained herein, the attachment means permit the garment to be fully reversible without modification. When reversed, the garment as presently shown in this illustration places the reflective element facing inward so that the animal's body heat is better contained. Thus, the garment may be used as a heat-reflector in warm outdoor environments or as a body warmer in the cold.

Figure 2:
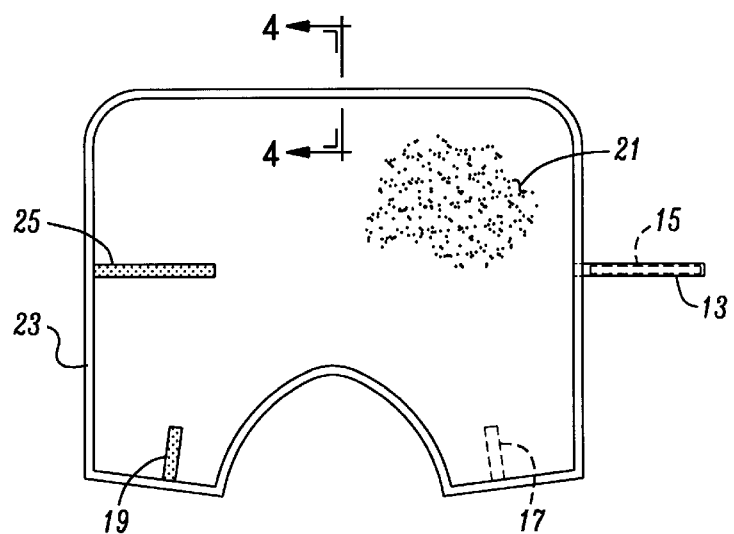
FIG. 2 shows a front view of the present invention.

FIG. 2 shows the general pattern of the present invention which is substantially rectangular, cut from flat sheet material, and constructed as follows. A first surface 21 is a heat-reflective layer and, preferably, an aluminized plastic film, while an opposing second surface is a water-repellent material bonded to the rear side. The pattern includes front, back, right and left side edges. The entire perimeter of this material is covered by a cloth piping 23 as more clearly shown in FIG. 3. Hook and loop attachment means are used in four places. On the left side, hook and loop attachment 25 is affixed to the face of the first surface. On the right side, a belly strap of flexible material 13, such as nylon, is attached along the edge. The belly strap on one side of the first surface facing directly opposite attachment means 25 includes hook and loop strip 15. The front edge of the garment has a U-shaped neck cutout and two separate attachment means extending from the front edge. One hook and loop strip is positioned on the left side of the neck cutout affixed to and facing outwardly from the front surface, and a second hook and loop strip is located on the opposite side of the neck cutout affixed to the second surface of the garment facing outwardly from that surface as shown in this figure. These first and second attachment means are positioned equidistant from, but on opposite sides of, an imaginary centerline "A" of the garment as shown in this figure.

Figure 3:
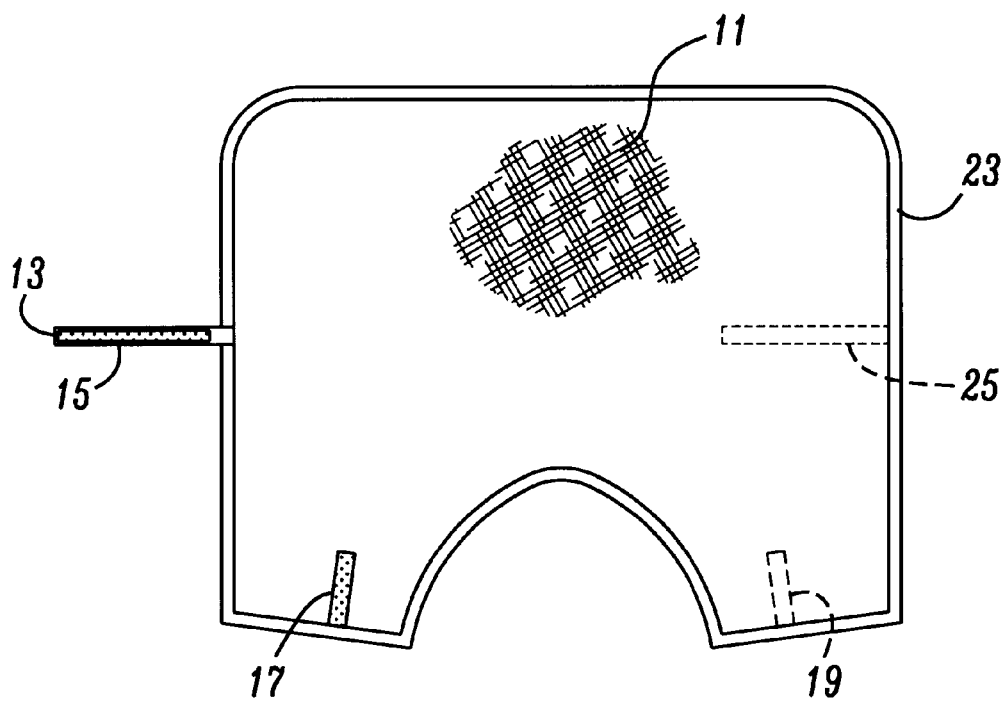
FIG. 3 shows a rear view of the present invention.

Referring now to FIG. 3, the second side surface of the coat opposite the first side surface shown in FIG. 2 is depicted. It will be readily apparent from this drawing that the two Velcro® attachment means at one side of the centerline face in the opposite direction from the hook and loop attachment means on the other side of the centerline. In this Figure, the attachment of rear-facing Velcro® strips 17 and 15 is also shown. The back surface 11 is a second ply of material which is preferably water repellent. The material of the preferred embodiment which provides the characteristics of layer 21 shown in FIG. 1 and layer 11 in this figure may be provided by the material sold by Metallized Material of Winchester, Massachusetts which consists of a lamination of aluminized clear polyethylene and colored polyethylene.

Figure 4:
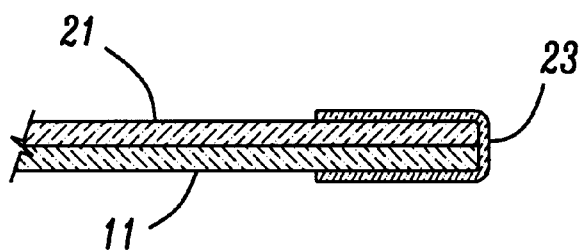
FIG. 4 is a side-sectional view of the present invention.

Referring to FIG. 4, the double-layer aspect of the material used in constructing the pet coat of the present invention is more clearly depicted. Reflective layer 21 is affixed to water repellent layer 11, preferably by an adhesive or heat fusion. Cloth piping 23 wraps around the side edges of the combined material and is affixed preferably by stitching. The piping both protects the edges of the material and provides greater comfort for the animal.

It should be understood that the above description discloses specific embodiments of the present invention and are for purposes of illustration only. There may be other modifications and changes obvious to those of ordinary skill in the art that fall within the scope of the present invention which should be limited only by the following claims and their legal equivalents.

What is claimed is:

1. A reversible all-weather pet garment, comprising:

a sheet of material cut along a pattern having an imaginary centerline, a from edge and two side edges, said pattern defining a coat which fits over the back and around the neck of a pet;

said material comprising two layers, a first layer having a heat-reflective surface an a second layer being water repellent, both layers being fused together; and two hook and loop fastening strips, each affixed to one of said layers along a front edge of said sheet, one facing forward and the other facing backward, such that the garment may be alternatively secured over the back and around the neck of the pet with either the first layer or the second layer facing outwardly of said pet, whereby when said first layer is facing outward, the pet is kept cool in hot weather and when the first layer is facing inwardly, the pet kept warm in cold weather.

2. The pet garment of claim 1, wherein said first layer is metalized plastic film.

3. The pet garment of claim 1, wherein said first and second layers comprise aluminized clear polyethylene and colored polyethylene.

4. The pet garment of claim 1, further comprising cloth piping around the perimeter of said material.

5. The pet garment of claim 4, wherein said cloth piping is affixed to said material by stitching.

6. The pet garment of claim 1, further including a belly strap of flexible material that releasably attaches to cooperating attachment means on the opposite side of said sheet material, said belly strap extending from a side edge of said garment.

7. The pet garment of claim 6, wherein said fastener strips are affixed across the surface of the garment one on each opposite sides of a neck cutout located along the front edge of said garment.

8. The pet garment of claim 7, wherein said belly strap attachment means is a hook-and-loop type fastener.

9. The pet garment of claim 8, wherein said neck cutout is U-shaped.

* * * * *